Figure 1:
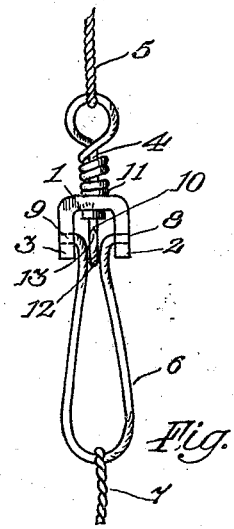

J. S. AUGUSTINE.
SWIVEL.
APPLICATION FILED SEPT. 24, 1908.

929,535. Patented July 27, 1909.

WITNESSES:
Ethel P. Freytag
E. T. De Giorgi

INVENTOR
Joseph S. Augustine
BY
Ridley & Love
ATTORNEYS

__UNITED STATES PATENT OFFICE.__

JOSEPH S. AUGUSTINE, OF TABERG, NEW YORK.

SWIVEL.

No. 929,535.        Specification of Letters Patent.        Patented July 27, 1909.

Application filed September 24, 1908. Serial No. 454,625.

*To all whom it may concern:*

Be it known that I, JOSEPH S. AUGUSTINE, a citizen of the United States, residing at Taberg, in the county of Oneida and State of New York, have invented certain new and useful Improvements in Swivels, of which the following is a specification, reference being had therein to the accompanying drawing.

My invention relates to an improved swivel, and I declare the following is a full, clear, concise and exact description thereof, sufficient to enable one skilled in the art to make and use the same, reference being had to the accompanying drawings in which like reference characters refer to like parts throughout.

While I term the device a swivel, it includes properly a swivel construction particularly for use in fishing tackle, as indicated in the drawings, and comprising means by which the members of the swivel considered as a whole can readily be separated when placed in a given position, but normally are held by the very construction of the parts from becoming disengaged. The use of the device is, for instance, if one desires to detach a snell or hook with short line attached from the fish-line proper and substitute a different snell or cord with hook thereon. Although it is shown in that single connection, it is obvious that it has a wide variety of uses.

In the drawings are shown two styles of construction.

Figure 2:
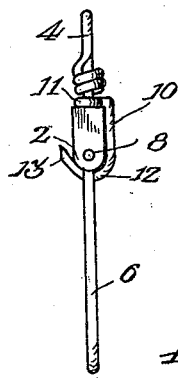
Figure 3:
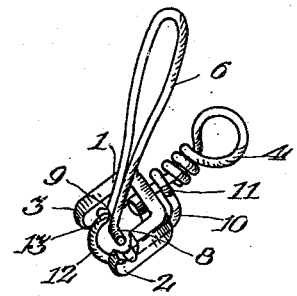
Figure 4:
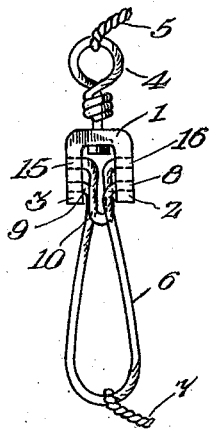
Figure 5:
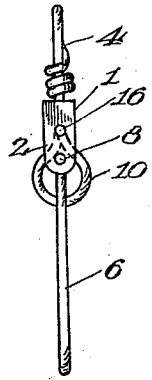
Figure 6:
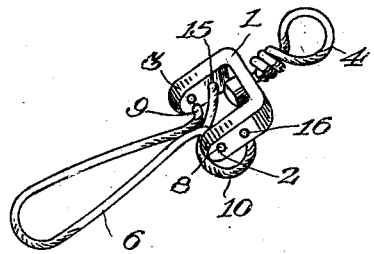

Figure 1 is a front view of one form of the device; Fig. 2 being a side view, the loop in each instance being in its normal position. Fig. 3 shows the loop in position for disconnecting, a small portion of the mounting being broken away for clearness of illustration. Fig. 4 shows a front view of a different construction or style of swivel; Fig. 5 being a side view, and Fig. 6 showing the parts in position for removal of the loop.

Referring to the figures in detail, 1 is a saddle or yoke with oppositely disposed arms 2 and 3. In this yoke is mounted a swivel-eye designated by 4 and of ordinary construction, to which may be attached the upper line 5.

6 is a spring loop to which is to be attached the lower line 7. The loop is formed of a spring wire with its outer end of suitable size. Its inner ends are fashioned, as at 8 and 9, to slip into bores provided therefor in opposite shoulders of the yoke or saddle. Normally the loop could be removed by pressing the ends together inwardly, and is normally retained in the position shown in the saddle by the resiliency of the wire.

The purpose of the invention is to provide means which will prevent the loop becoming accidentally disengaged. It will be seen that there is sufficient space between the ends of the loops where they are supported in the yoke to allow pressing them together to withdraw either one from its bearing in the loop when the other can also be released. Or, both can be released if one strand or section of the wire is pressed to one side so as to pass the opposite one as both are withdrawn. To prevent accidental release of these ends of the loop I provide a clip formed to occupy the space between the ends of the loop when they are in normal position. This clip is designated by 10 and may be given a variety of forms, of which I show two. In the first form, the clip comprises a piece of wire with a turn around the swivel, as at 11, whence it passes downward along side the yoke to a point below the axis on which the loop is mounted; thence it turns inward, as at 12, between the ends of the loop and upward, as at 13, on the opposite side. It will be seen, in Fig. 1 particularly, that the position of the clip between the ends of the loop will prevent them or either of them from being pressed inwardly out of their bearing in the saddle, although free movement is given to the swivel above and to the swinging motion of the loop below. By referring to Fig. 3 it will be seen, however, that when the loop is turned in an upward position so that its end portions 8 and 9 are clear of the tip 13 of the clip, the ends of the loop can be pressed together and one or both, as already described, removed from their bearing. The other form of the device is essentially the same in its purpose and function. It comprises the same saddle, swivel and loop. Instead, however, of the form of clip shown in Fig. 1, I employ a different style of clip, which as in the other case is substantially of the form of a ring, but having its ends mounted in the yoke. One end of the ring, as 15, is mounted in the saddle at a point above that at which the corresponding end of the loop is mounted. From thence it is bent in the form of a circle, the other end of the clip being mounted in like position in the opposite shoulder of the saddle, as at 16. Between these two points the ring lies in a curve, as clearly seen, the ring lying between the ends of the loop, as in the other case. It will be seen in Fig. 6 that this clip can be swung so that the ring or outer portion is crowded up against the head of the saddle so that the loop of the ring is brought from between the ends of the loop when one or both of such ends can be removed from their bearing in the saddle.

It will be seen that the essence of the invention is to provide a clip normally in position between the ends of the loop and retaining them closely in their bearing in the saddle, and providing means for locking the loop in such bearings or permitting the loop to be removed therefrom, and the replacement of the same or another.

Having described my invention, what I claim as new and desire to secure by Letters Patent, is:

1. A swivel comprising a saddle and a loop removably mounted on the saddle, and means mounted on the saddle and normally retaining the loop mounted on the saddle, substantially as described.

2. In a device of the character described, a saddle, a swivel linked thereon, a loop mounted with its opposite ends removably supported in the saddle, and means on the saddle normally confining the said ends in their said supported position but adapted to permit the removal of the loop by manipulation of the loop and the saddle, substantially as described.

3. In a device of the character described, the combination of a saddle, a loop swingably mounted therein, and a clip normally retaining the loop in its mountings, the said parts being arranged so that manipulation of the same frees the loop from its mounting, substantially as described.

4. In a device of the character described, a saddle, a loop supported in journals thereon, said journals, and means positioned between the ends of the loop adapted to retain said ends in the saddle, substantially as described.

5. In a device of the character described, a saddle, a loop having its ends pivotally mounted in the saddle, and means mounted in coöperative relation with the loop to hold it in place and adapted by manipulation of the members to release the ends of the loop from their bearing in the saddle, substantially as described.

In testimony whereof I affix my signature in presence of two witnesses.

JOSEPH S. AUGUSTINE.

Witnesses:
ELEANOR T. DE GIORGI,
ALMA M. GERDON.